(12) United States Patent
Uehira et al.

(10) Patent No.: US 7,522,355 B2
(45) Date of Patent: Apr. 21, 2009

(54) LENS UNIT AND MANUFACTURING METHOD THEREOF

(75) Inventors: Masayoshi Uehira, Toyohashi (JP); Akihiko Matsumoto, Toyokawa (JP); Katsushi Watanabe, Toyokawa (JP); Toshiyuki Majima, Toyokawa (JP)

(73) Assignee: Konica Minolta OPTO, Inc., Tokyo (JP)

( * ) Notice: Subject to any disclaimer, the term of this patent is extended or adjusted under 35 U.S.C. 154(b) by 0 days.

(21) Appl. No.: 11/091,290

(22) Filed: Mar. 28, 2005

(65) Prior Publication Data

US 2005/0219717 A1  Oct. 6, 2005

(30) Foreign Application Priority Data

Mar. 31, 2004 (JP) ............................. 2004-106849
Jun. 30, 2004 (JP) ............................. 2004-192785

(51) Int. Cl.
*G02B 9/04* (2006.01)
*G02B 9/12* (2006.01)

(52) U.S. Cl. .................. 359/793; 359/784; 359/900
(58) Field of Classification Search ............... 359/793, 359/784, 900
See application file for complete search history.

(56) References Cited

U.S. PATENT DOCUMENTS

| 4,636,609 | A |   | 1/1987 | Nakamata |
| 5,548,450 | A | * | 8/1996 | Kang .......................... 359/822 |
| 7,088,397 | B1 | * | 8/2006 | Hunter et al. ................ 348/374 |
| 7,170,693 | B2 | * | 1/2007 | Maeda et al. ................ 359/811 |

FOREIGN PATENT DOCUMENTS

| JP | 07-092301 |   | 4/1995 |
| JP | 2001-301053 | * | 10/2001 |
| JP | 2003-181931 |   | 7/2003 |

* cited by examiner

*Primary Examiner*—William C Choi
*Assistant Examiner*—Jack Dinh
(74) *Attorney, Agent, or Firm*—Brinks Hofer Gilson & Lione

(57) ABSTRACT

In the case where a lens unit where two ore more transparent resin lenses are combined is constituted, at least one transparent resin lens contains infrared absorbent. When the lens unit is assembled, an infrared laser is emitted to a joined portion between the transparent resin lens and the other transparent resin lens. As a result, the emitted infrared ray is absorbed by the infrared absorbent, so that the transparent resin lenses are welded to each other. An opaque lens barrel which holds the entire lens unit and the transparent resin lenses are joined by welding.

17 Claims, 6 Drawing Sheets

LENS UNIT AND MANUFACTURING METHOD THEREOF

The present application claims priority to Japanese Patent Application No. 2004-106849 filed in Mar. 31, 2004 and No. 2004-192785 filed Jun. 30, 2004, the entire contents of which are hereby incorporated by reference.

BACKGROUND OF THE INVENTION

1. Field of the Invention

The present invention relates to a lens unit including a plurality of transparent resin lenses and a manufacturing method thereof. More concretely, the invention relates to the lens unit where a plurality of resin lenses are held in a lens barrel which covers them, and the manufacturing method thereof.

2. Description of the Related Art

Conventionally, a lot of transparent lenses made of resin are used as optical lenses. Particularly a plurality of resin lenses are mostly combined to be used as lenses for cameras. For this reason, the resin lenses or the resin lenses and a lens barrel for holding them should be fixed to one another. In such resin lenses, an area for joining is formed integrally with outer peripheries of effective areas of the lenses, and these areas are joined by utilizing adhesive or ultrasonic welder.

On the contrary, U.S. Pat. No. 4,636,609 and Japanese Patent Application Laid-Open No. 2003-181931 disclose a method of joining resin materials using laser beam. For example, U.S. Pat. No. 4,636,609 discloses the joining method of superposing an absorptive material and an unabsorbable material with respect to laser beams and emitting a laser beam to a side of the unabsorbable material. Further, Japanese Patent Application Laid-Open No. 2003-181931 discloses the joining method of holding a thin infrared absorptive transparent film between transparent resin members and emitting a laser beam thereto. Japanese Patent Application Laid-Open No. 7-92301 discloses a resin lens in which ultraviolet absorbent or infrared absorbent is mixed in a transparent lens so that transmittance for each wavelength region is adjusted.

The conventional joining method for the lens units, however, has the following problems. In the joining method using adhesive, it takes a long time to apply and harden adhesive. Further, an appearance problem due to wrap-around of the adhesive to the lens surface or the like possibly arises. In the joining method using the ultrasonic welder, since a horn should be used for pushing, a shape and a size of the lens are limited. Further, in a miniature lens unit or the like which is used in miniature cameras of cellular phones or the like, a work for holding an infrared absorptive film is not easy, and a number of parts increases, thereby possibly deteriorating assembly workability.

SUMMARY OF THE INVENTION

It is a main object of the present invention to provide a lens unit which has satisfactory assembly workability and can be miniaturized, and a manufacturing method thereof.

In order to achieve the above object and another object, from a certain aspect of the invention, a lens unit has two or more resin lenses, at least one resin lens contains light beam absorbent, and that resin lens and the other resin lens are joined by welding.

From another aspect of the present invention, a method of manufacturing a lens unit including a plurality of lenses includes the following steps:

bringing a first lens which is formed by transparent resin and contains light beam absorbent into contact with a second lens formed by transparent resin so as to hold them; and emitting a light beam which is absorbed by the light beam absorbent so as to weld the first lens to the second lens.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawing.

DETAILED DESCRIPTION OF THE PREFERRED EMBODIMENTS

First Embodiment

A first embodiment where the present invention is concretized is explained below in detail with reference to the accompanying drawings. In the first embodiment, the present invention is applied to a lens unit where a plurality of optical lenses are combined.

Figure 1:
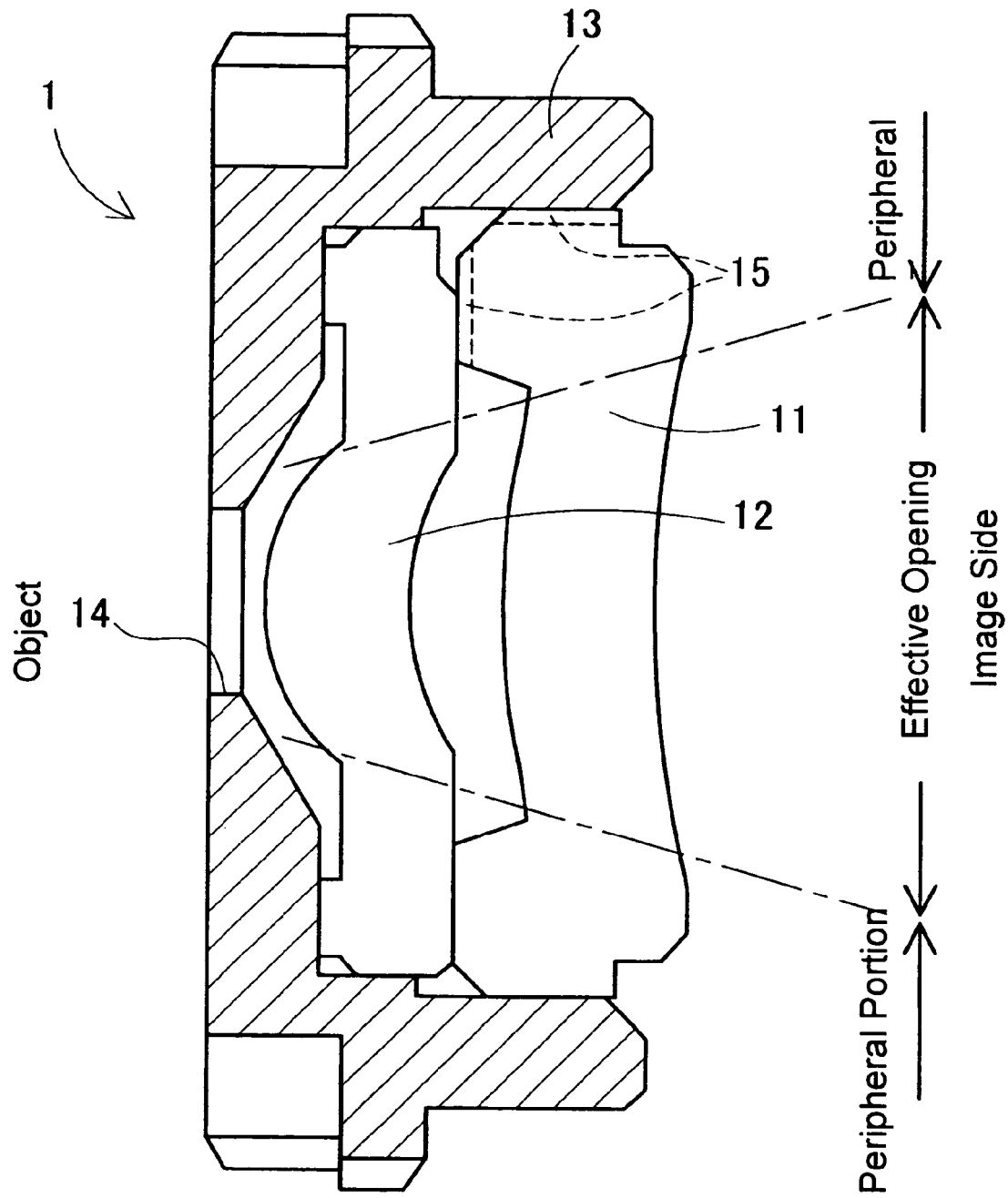
FIG. 1 is a schematic sectional view illustrating a lens unit according to a first embodiment.

As shown in FIG. 1, the lens unit 1 of the first embodiment is constituted so that transparent resin lenses 11 and 12 are combined so as to be installed in a lens barrel 13. In the drawing, a left side is an object side, and an imaging surface is arranged on a right side. The lens barrel 13 is provided with a through hole 14 on a center portion of the object side. Light which passes from the object side through the through hole 14 reaches the imaging surface via the resin lenses 11 and 12.

The resin lens 11 is a general transparent lens. The resin lens 11 transmits light well in both visible area and infrared area. The resin lens 12 contains infrared absorbent which is publicly known as transparent resin (for example, described in Japanese Patent Application Laid-Open No. 7-92301). The resin lens 12 transmits the light in the visible area and partially absorbs the light in an infrared area.

As shown in FIG. 1, in the resin lenses 11 and 12, effective openings in their center portions and peripheral portions provided to outer peripheries of the effective openings are formed integrally. A range where the light which passes from the object side through the through hole 14 becomes the effective opening of each lens. The resin lenses 11 and 12 are joined at their peripheral portions.

The lens barrel 13 is formed into an approximately cylindrical shape by opaque resin. The lens barrel 13 absorbs light in both the visible area and the infrared area well. The lens barrel 13 is formed so as to be capable of contacting with the peripheral portions of the resin lenses 11 and 12 around the through hole 14 or on the inner surface of the cylinder portion.

On these contact portions, the lens barrel 13 is joined to the resin lenses 11 and 12. As a result, the resin lenses 11 and 12 and the lens barrel 13 are fixed to each other with a suitable distance between the effective openings.

A predetermined space is, therefore, formed between the effecting opening of the resin lens 11 and the effective opening of the resin lens 12 as shown in FIG. 1, and their peripheries are joined. For this reason, a relief passage for internal air is not preset at the time of assembly, and thus assembly dispersion occurs. Further, transparency of the resin lenses 11 and 12 is eliminated due to gas generated at the time of welding, and the internal air expands due to environmental factors and heat so that the resin lenses 11 and 12 are in danger of being deformed. For this reason, a ventilation groove 15 is provided to a predetermined place of the resin lens 11. Due to this ventilation groove 15, the space surrounded by the resin lenses 11 and 12 is connected to the outside. The ventilation groove 15 can prevent dew formation inside the lens unit 1. The ventilation groove 15 may be formed on the resin lens 12.

Figure 2:
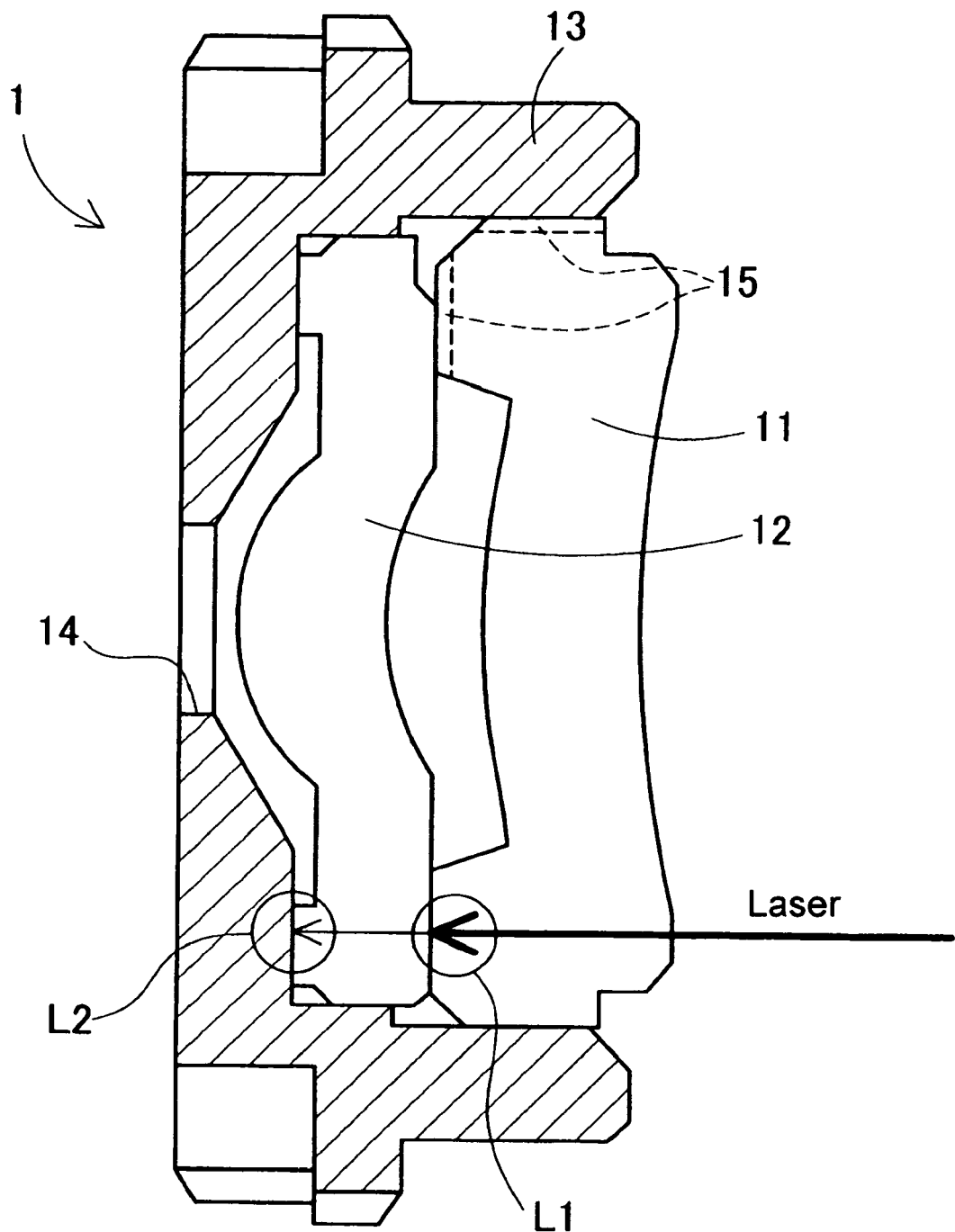
FIG. 2 is an explanatory diagram illustrating a laser joining method.

A method of manufacturing such a lens unit 1 is explained below. The resin lens 11, the resin lens 12 and the lens barrel 13 are formed by resin made of respective materials. They are combined into a predetermined arrangement, and infrared laser is emitted to the peripheral portions of the resin lenses 11 and 12 from a right direction as shown in FIG. 2. As a result, the infrared laser transmits through the resin lens 11, and reaches a joined portion L1 of the resin lenses 11 and 12. At the joined portion L1, the resin lens 12 partially absorbs the infrared ray, and the absorbing portion generates heat so as to be dissolved. Due to this heat, also the resin lens 11 is slightly dissolved near the joined portion L1 so as to be welded to the resin lens 12.

Further, the infrared laser passes through the resin lens 12 while it is being absorbed bit by bit, and a part of the infrared laser which is not absorbed by the resin lens 12 reaches a joined portion L2 of the resin lens 12 and the lens barrel 13. Since the lens barrel 13 absorbs the infrared ray well, the lens barrel 13 generates heat so as to be dissolved by the infrared laser, and the resin lens 12 and the lens barrel 13 are welded to be joined at the joined portion L2.

Figure 3:
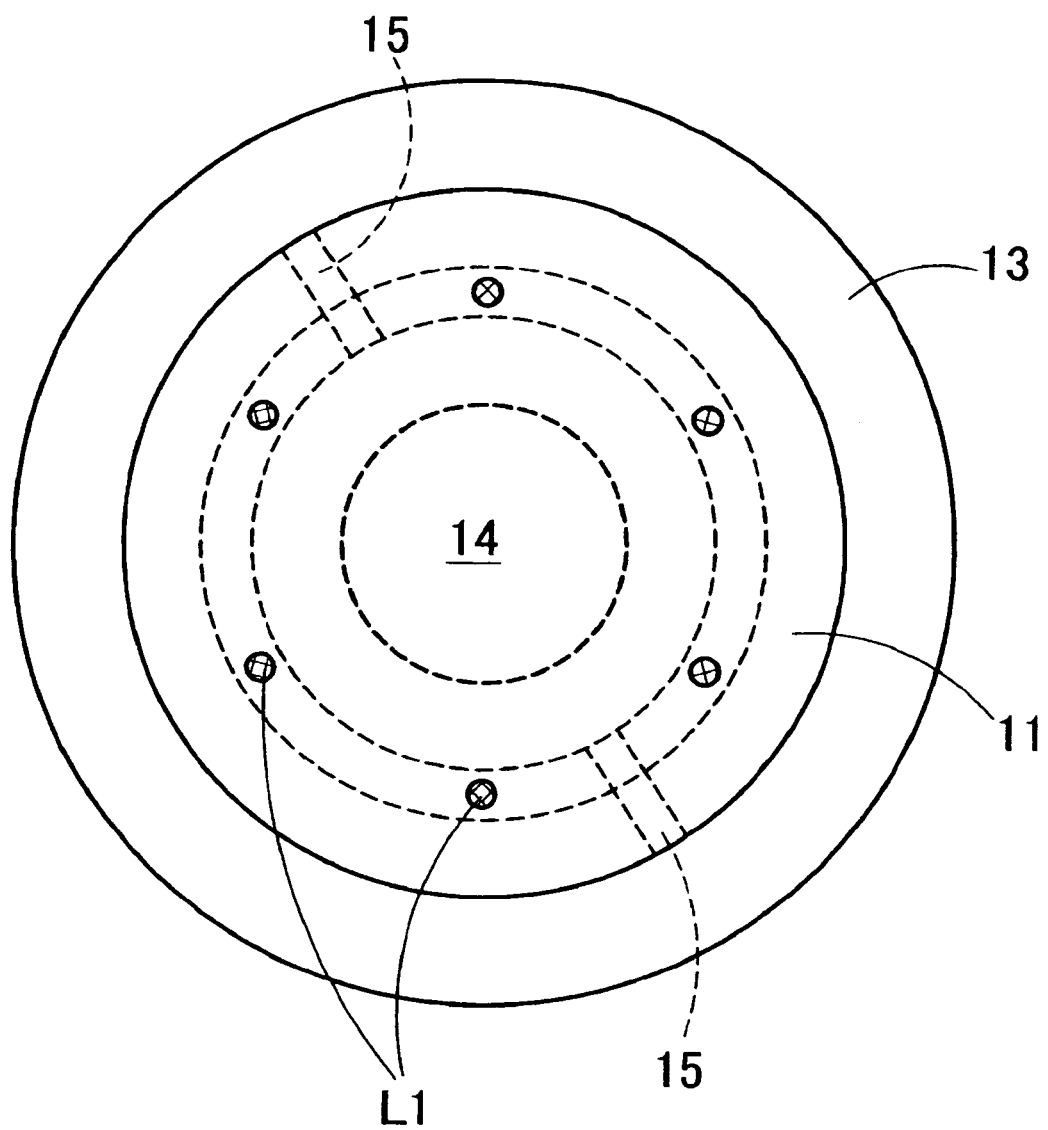
FIG. 3 is an explanatory diagram illustrating the laser joining method.

At this time, as shown in FIG. 3, plural parts of the peripheral portion are joined so that the joining between the resin lenses 11 and 12 and the joining between the resin lens 12 and the lens barrel 13 can be secured. FIG. 3 is a diagram viewed from the right in FIG. 2. In FIG. 3, the joined portion L1 is provided to six places which are symmetrical with respect to the through hole 14. The plural joined portions L1 may be joined simultaneously by a plurality of laser heads or successively by one laser head.

The joining using the infrared laser can be variously devised in the following manners. For example, an embossing form is formed on the joined surfaces corresponding to the joined portions L1 and L2 of the resin lens 12, so that the laser absorption on these portions may be improved. The joined portions L1 of the resin lenses 11 and 12 are formed on the mirror surfaces, so that the adhesive property of the resins may be improved. As a result, heat is satisfactorily transmitted to the resin lens 11 which does not absorb the laser beam, so that the welding is secured. Further, gate cut may be carried out on the resin lenses 11 and 12 simultaneously by emitting the infrared laser.

In the case where high eccentricity accuracy between the resin lenses 11 and 12 is required, the resin lenses 11 and 12 are fixed accurately by a jig or the like, and only the joined portions L1 are joined by the infrared laser. Thereafter, the joined resin lenses 11 and 12 are incorporated into the lens barrel 13, so that the joined portions L2 may be joined. In this case, it is preferable that the joined portions L1 and L2 are not provided in the same positions but the joined portions L2 are provided between the joined portions L1. Further, when the joined portions L2 are joined, infrared laser with wavelength such that an amount of absorption due to the resin lens 12 is small is selected, thereby preventing the deformation of the resin lens 12.

When dye or pigment which blocks light in the visible area and transmits light in the infrared area is mixed in the lens barrel 13, the infrared laser is transmitted from the outside of the lens unit 1 through the lens barrel 13 so as to be capable of being emitted to the resin lenses 11 and 12. As a result, the inner surface of the lens barrel 13 from the object side to the joined portions L2 can be joined to the resin lens 12. The infrared laser is emitted from the outer periphery side to the joined surface between the resin lenses 11 and 12, so that both the lenses can be joined. Further, the infrared absorbent may be contained only in the peripheral portion of the resin lens 12 including the joined portions L1 and L2.

As explained in detail above, according to the lens unit 1 of the first embodiment, when the infrared absorbent is contained in the resin lens 12, the joined portions L1 between the resin lenses 11 and 12 and the joined portions L2 between the resin lens 12 and the lens barrel 13 can be joined by infrared laser. The assembly workability of the lens unit 1 is, therefore, satisfactory.

A solid-state image sensing device such as CCD generally has sensibility in the infrared area as well as the visible light area, and thus the infrared ray causes a noise. For this reason, in a lens unit for cameras using CCD or the like, an infrared ray cut filter is inserted on the side which is closer to an object than the solid-state image sensing device. In the case of this embodiment, however, since the infrared absorbent contained in the lens absorbs the infrared ray, the infrared ray cut filter is not necessary.

Second Embodiment

A second embodiment where the present invention is concretized is explained in detail below with reference to the accompanying drawings. The second embodiment is a lens unit which is used in cameras or the like having solid-state image sensing devices such as CCD, and the present invention is applied to the lens unit having three or more optical lenses.

Figure 4:
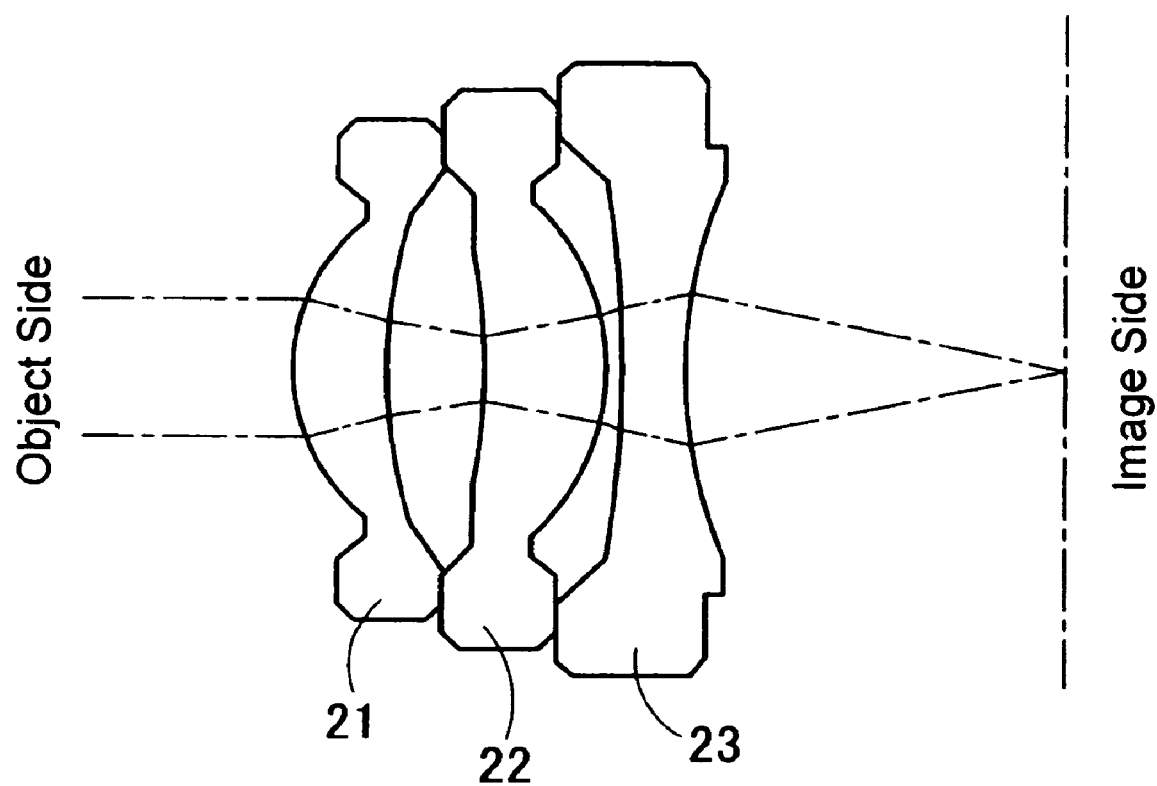
FIG. 4 is a schematic sectional view illustrating the lens unit according to a second embodiment.

The lens unit 2 of the second embodiment is, as shown in FIG. 4, constituted so that three transparent resin lenses 21, 22 and 23 are combined. In FIG. 4, a left side in the drawing is the object side, and an image pickup device such as CCD is arranged on a right side. Light which transmits from the object side through the resin lenses 21, 22 and 23 is imaged on an imaging surface of the image pickup device.

In the lens unit 2 of the second embodiment, the infrared absorbent is contained in the effective opening of any one of the resin lenses 21, 22 and 23. As a result, an infrared portion of the light which enters the lens unit 2 is absorbed by the resin lenses 21, 22 and 23 until the light reaches the image pickup device. A noise due to the infrared ray is, therefore, eliminated without providing the infrared ray cut filter. One or a plurality of the lenses may contain the infrared absorbent.

After various conditions are taken into consideration, a determination is made which resin lenses 21, 22 and 23 contains the infrared absorbent. For example, when the resin lens 21 whose volume is the smallest contains the infrared absorbent, an amount of the infrared absorbent to be mixed can be minimum. When the resin lens 22 whose thickness at the effective opening is the largest contains the infrared absorbent, the absorption of the infrared ray due to the lens unit 2 can be satisfactory.

Further, when the resin lens 22 held between the resin lenses 21 and 23 contains the infrared absorbent, laser is emitted to both the resin lenses 21 and 23, so that the resin lens 22 can be joined to the resin lenses 21 and 23 simultaneously. When the resin lens 23 which is arranged in the position closest to the image pickup device contains the infrared absorbent, a decrease in the light amount in the lens unit 2 can be suppressed to minimum. When the resin lens 21 which is arranged on the position closest to the object side contains the infrared absorbent, scattering of the infrared ray in the lens unit 2 is prevented, so that the infrared ray can be eliminated efficiently before the infrared ray reaches the image pickup device.

In the lens unit 2, since the infrared ray is absorbed by any one of the resin lenses 21, 22 and 23, even if the lens unit 2 is used in the camera utilizing the solid-state image sensing device, the infrared ray cut filter does not have to be provided. As a result, the entire optical lens 2 can be miniaturized. Further, the lens unit 2 of the second embodiment and the lens unit 1 of the first embodiment can be combined. Instead that one lens absorbs all infrared rays, infrared absorbent for different wavelengths of light to be absorbed may be contained in a plurality of resin lenses, so that infrared rays with wide bandwidth can be absorbed.

As detailed above, according to the lens unit 2 of the second embodiment, since any one of the resin lenses 21, 22 and 23 absorbs the infrared ray, the infrared ray cut filter is not necessary. The lens unit 2 can be, therefore, miniaturized in the cameras having the solid-state image sensing devices.

Third Embodiment

The infrared absorbent is used in the first and the second embodiments. On the contrary, in a third embodiment, instead of the infrared absorbent, ultraviolet absorbent is contained in the transparent resin lens, and ultraviolet laser is emitted so that the resin lenses are welded.

Figure 5:
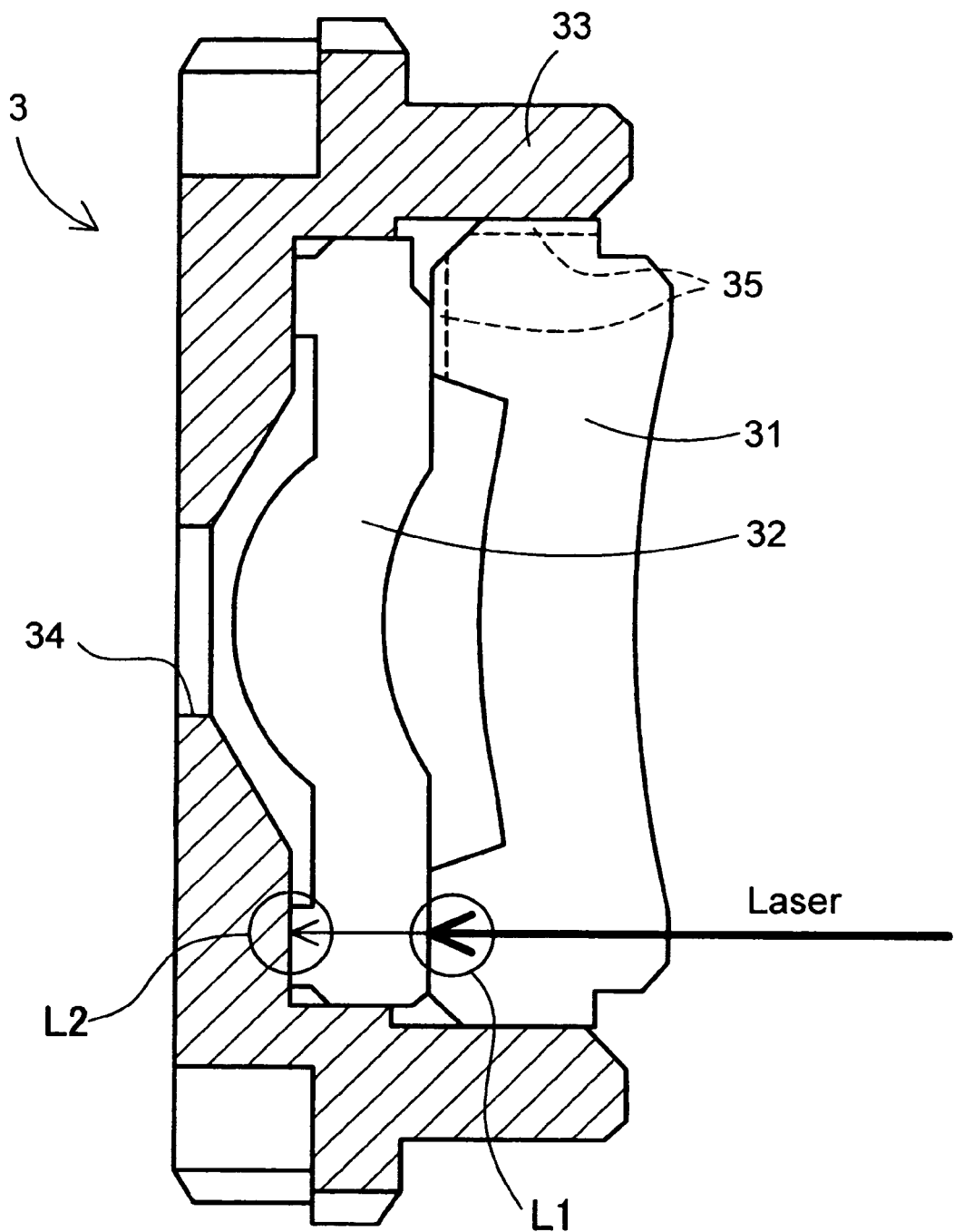
FIG. 5 is a schematic sectional view illustrating the lens unit according to a third embodiment.

The lens unit 3 of the third embodiment has the same shape as that of the lens unit 1 in the first embodiment as shown in FIG. 5. The resin lens 31 is formed by a material which transmits visible light and ultraviolet ray well, and the resin lens 32 is formed so that the transparent resin contains the ultraviolet absorbent. As the ultraviolet absorbent, publicly-known materials (for example, compounds such as benzophenone, benzotriazole, phenyl salicate and cyanoacrylate) can be used. The lens barrel 33 is formed by a material which absorbs the light in both the visible area and the ultraviolet area.

Figure 6:
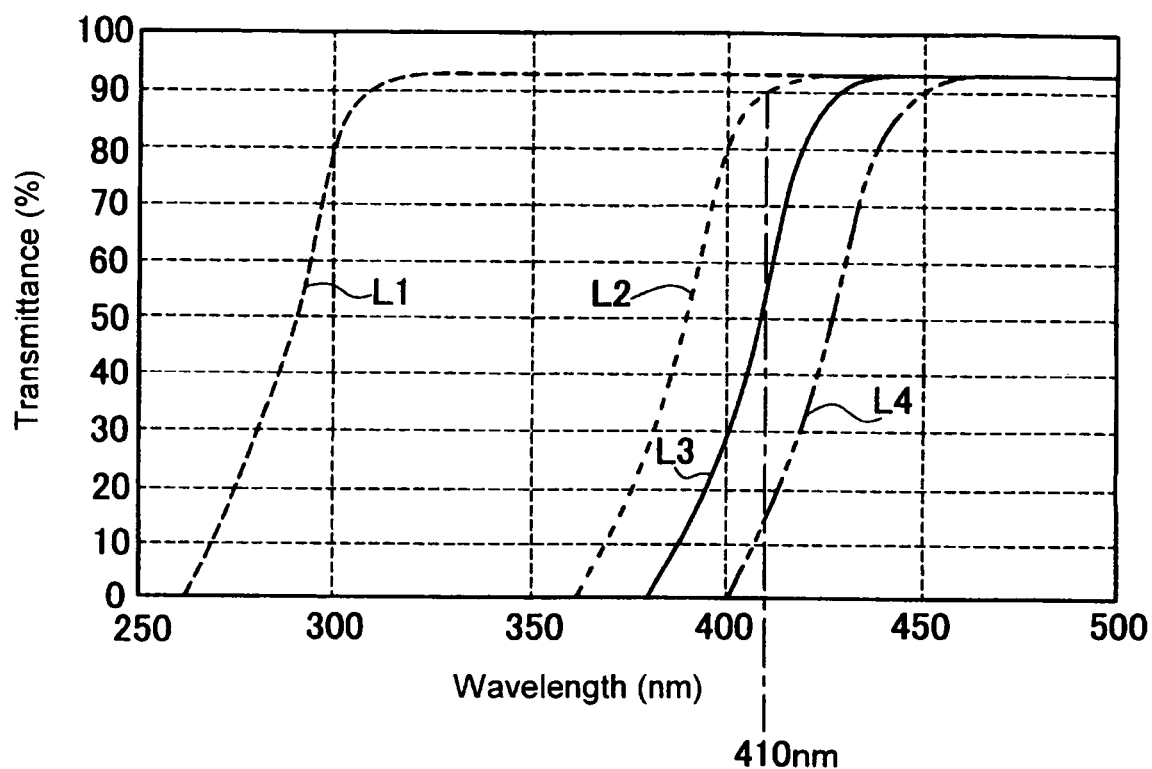
FIG. 6 is a graph illustrating a relationship between an amount and transmittance of ultraviolet absorbent to be added to the lens.

As shown in FIG. 6, the transmittance of the resin lens 32 for each wavelength varies with an amount of the ultraviolet absorbent contained in the resin lens 32. A graph L1 represents the transmittance of the resin lens 32 to which the ultraviolet absorbent is not added at all, and it transmits the light with wavelength of not less than about 300 nm approximately completely. Graphs L2 to L4 represent the transmittance of the resin lens 32 to which the ultraviolet absorbent is added, and the loadings differ in a manner that L2<L3<L4. As shown in FIG. 6, as the loadings of the ultraviolet absorbent are larger, the ultraviolet ray with longer wavelength can be absorbed.

For example, in the case where an ultraviolet ray with wavelength of 410 nm shown by an alternate long and short dash line in the drawing is used, it is almost transmitted through the resin lens shown by the graph L2, the transmittance of the graph L3 is about 50%, and the ultraviolet ray is hardly transmitted through the resin lens of the graph L4. In the third embodiment, the resin lens 32, to which the ultraviolet absorbent whose loadings is the approximately same as that of the resin lens of the graph L3 is added, is used.

As the ultraviolet laser for welding, an ultraviolet ray with wavelength of about 410 nm is used. As a result, the resin lens 32 partially absorbs the ultraviolet laser.

A method of manufacturing the lens unit 3 is explained below. The resin lens 31, the resin lens 32 and the lens barrel 33 are formed by resin made of respective materials. They are combined in a predetermined arrangement, and the ultraviolet laser is emitted to the peripheral portions of the resin lenses 31 and 32 from the right direction as shown in FIG. 5. As a result, the ultraviolet laser transmits through the resin lens 31 and reaches the joined portion L1 between the resin lenses 31 and 32. On the joined portion L1, the resin lens 32 partially absorbs the ultraviolet ray, and that portion generates heat so as to be dissolved. Due to this heat, also the resin lens 31 is slightly dissolved near the joined portion L1 so as to be welded to the resin lens 32.

Further, the ultraviolet laser passes through the resin lens 32 while it is being absorbed bit by bit, and a part of the ultraviolet laser which is not absorbed by the resin lens 32 reaches the joined portion L2 between the resin lens 32 and the lens barrel 33. Since the lens barrel 33 absorbs the ultraviolet ray well, it generates heat so as to be dissolved by the ultraviolet laser, and the resin lens 32 and the lens barrel 33 are welded to be joined on the joined portion L2.

Even if the ultraviolet ray is used, the transparent resin lenses can be welded similarly to the case using the infrared ray.

Instead that only one lens contains the ultraviolet absorbent, a plurality of lenses may contain the ultraviolet absorbent. In this case, an amount of the ultraviolet absorbent to be contained is changed according to the lenses, or the ultraviolet absorbent for different wavelengths of light to be absorbed is contained in a plurality of resin lenses so that the lenses may be formed. As a result, a wavelength of the ultraviolet ray to be emitted at the time of welding is selected, so that only desired places can be welded.

When absorbent which absorbs infrared ray is further contained in any one of the lenses, that lens can serve also as the infrared ray cut filter. As a result, the infrared ray cut filter is not necessary, thereby the lens unit 3 can be further miniaturized.

The above embodiments are only examples, and the present invention is not limited to them. The present invention shall be, therefore, improved and modified variously without departing from the scope of the gist.

For example, the shapes and the number of the lenses and the lens barrel explained in the respective embodiments are only examples, and thus they can be suitably changed according to applications or the like.

Further, the arrangement and the number of the joined portions L1 and L2 can be suitably changed. While the laser is being emitted, the laser head may be moved circumferentially.

For example, the light beam to be emitted for welding may be a light beam which is absorbed by the light beam absorbent to be contained in the transparent resin lens, and thus it does not have to be limited to the infrared ray, the infrared laser, the ultraviolet ray and the ultraviolet laser.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. A lens unit comprising:
   at least two resin lenses;
   wherein at least one resin lens is formed as a mix of resin and a light absorbing material, and the two resin lenses are joined by welding; and
   wherein opposing surfaces of central portions of the two resin lenses are spaced apart and form a gap therebetween.

2. A lens unit according to claim 1 further comprising:
   an opaque lens barrel, wherein the at least one resin lens and the lens barrel are joined by welding.

3. A lens unit according to claim 1 further comprising a ventilation groove formed on at least one of the resin lenses for connecting a welded portion of the two resin lenses to the outside portion of the lens unit.

4. A lens unit according to claim 1, wherein the light absorbing material absorbs infrared light.

5. A lens unit according to claim 1, wherein the light absorbing material absorbs ultraviolet light.

6. A lens unit according to claim 1, further including at least three transparent resin lenses; and
   wherein the at least one resin lens is held between two other resin lenses.

7. A lens unit according to claim 1, wherein a resin lens whose
   volume is the smallest contains the light absorbing material.

8. A lens unit according to claim 1, wherein the resin lens which is arranged in the position closest to an image pickup device contains the light absorbing material.

9. A lens unit according to claim 1, wherein the two resin lenses are joined at their peripheral portions.

10. A lens unit according to claim 1, wherein peripheral portions of each of the at least two resin lenses are in direct contact and are joined by welding.

11. A method of manufacturing a lens unit including a plurality of lenses, comprising the steps of:
    bringing a first lens, which is formed as a mix of transparent resin and a light absorbing material, into contact with a second lens, which is formed of the transparent resin, so as to hold the first and second lenses in a fixed relationship;
    maintaining a gap between opposing surfaces of central portions of the first and second lens; and
    emitting a light which is absorbed by the light absorbing material so as to weld the first lens to the second lens.

12. A method according to claim 11, further comprising the steps of:
    welding an opaque lens barrel and the first transparent resin lens by emitting the light.

13. A method according to claim 11, wherein both sides of one resin lens are welded at one time.

14. A method according to claim 11, wherein the light emitted for welding is infrared light.

15. A method according to claim 11, wherein the light emitted for welding is ultraviolet light.

16. A method according to claim 11, wherein the light is emitted through the second transparent resin lens.

17. A method according to claim 11, wherein bringing the first lens into contact with the second lens further includes welding peripheral portions of the first and second lenses.

* * * * *

UNITED STATES PATENT AND TRADEMARK OFFICE
CERTIFICATE OF CORRECTION

PATENT NO.          : 7,522,355 B2                                           Page 1 of 1
APPLICATION NO. : 11/091290
DATED                 : April 21, 2009
INVENTOR(S)        : Masayoshi Uehira et al.

It is certified that error appears in the above-identified patent and that said Letters Patent is hereby corrected as shown below:

<u>On the Title Page</u>

Item (57), line 1, under "ABSTRACT", after "unit where two" delete "ore" and substitute --or-- in its place.

Signed and Sealed this

Twenty-second Day of September, 2009

David J. Kappos
*Director of the United States Patent and Trademark Office*